United States Patent
Su et al.

(10) Patent No.: US 9,948,624 B2
(45) Date of Patent: Apr. 17, 2018

(54) KEY DOWNLOADING METHOD, MANAGEMENT METHOD, DOWNLOADING MANAGEMENT METHOD, DEVICE AND SYSTEM

(71) Applicant: Fujian LANDI Commercial Equipment Co., Ltd., Fujian (CN)

(72) Inventors: Wenlong Su, Fujian (CN); Luqiang Meng, Fujian (CN); Yixuan Hong, Fujian (CN)

(73) Assignee: FUJIAN LANDI COMMERCIAL EQUIPMENT CO., LTD, Fujian (CN)

( * ) Notice: Subject to any disclaimer, the term of this patent is extended or adjusted under 35 U.S.C. 154(b) by 185 days.

(21) Appl. No.: 14/777,474

(22) PCT Filed: Jan. 23, 2014

(86) PCT No.: PCT/CN2014/071259
§ 371 (c)(1),
(2) Date: Sep. 15, 2015

(87) PCT Pub. No.: WO2014/139343
PCT Pub. Date: Sep. 18, 2014

(65) Prior Publication Data
US 2016/0036793 A1    Feb. 4, 2016

(30) Foreign Application Priority Data
Mar. 15, 2013    (CN) .......................... 2013 1 0084397

(51) Int. Cl.
*H04L 29/06*    (2006.01)
*H04L 9/08*    (2006.01)
(Continued)

(52) U.S. Cl.
CPC .......... *H04L 63/062* (2013.01); *H04L 9/0825* (2013.01); *H04L 9/0836* (2013.01);
(Continued)

(58) Field of Classification Search
CPC ... H04L 63/062; H04L 9/0825; H04L 9/0836; H04L 9/30; H04L 9/3265
(Continued)

(56) References Cited

U.S. PATENT DOCUMENTS 7,159,114 B1 *    1/2007   Zajkowski ......... G06Q 20/3552
                                                    380/259
7,188,110 B1 *    3/2007   Ludtke ................. G06Q 20/341
                                                    382/115
(Continued)

FOREIGN PATENT DOCUMENTS

CN    101807994 A    8/2010
CN    101930644 A    12/2010
(Continued)

OTHER PUBLICATIONS

Hassinen, "Utilizing national public-key infrastructure in mobile payment systems", Apr. 20, 2007, ScienceDirect, pp. 214-231.*
(Continued)

*Primary Examiner* — Taghi Arani
*Assistant Examiner* — Gregory Lane
(74) *Attorney, Agent, or Firm* — Stein IP, LLC (57) ABSTRACT

Disclosed is a key downloading method. The method comprises: sending a hardware series number (SN) and a first random number (Rnd1) to a key server; receiving a second random number (Rnd2), a first encrypted text (C1) and a key server working certificate (KSWCRT) sent by the key server; authenticating the validity of KSWCRT by using a KSRCRT; if valid, extracting a public key (PuKS) from the KSWCRT, and decrypting the first encrypted text (C1) by using the PuKS to obtain a third random number (Rnd1'); determining whether Rnd1 is consistent with Rnd1'; if consistent, encrypting the second random number (Rnd2) by using a terminal authentication public key (TKP_Pu) to
(Continued)

generate a third encrypted text (C2'), and sending the C2' to the key server; receiving an key encrypted text (Ctmk) sent by the key server; and obtain a master key (TMK), and storing the TMK in a security control module.

6 Claims, 5 Drawing Sheets

(51) Int. Cl.
  *H04L 9/32* (2006.01)
  *H04L 9/30* (2006.01)
(52) U.S. Cl.
  CPC .............. *H04L 9/30* (2013.01); *H04L 9/3265* (2013.01); *H04L 63/0823* (2013.01); *H04L 2209/56* (2013.01)
(58) Field of Classification Search
  USPC .................................................. 713/171, 156
  See application file for complete search history.

(56) References Cited

U.S. PATENT DOCUMENTS

| | | | | |
|---|---|---|---|---|
| 8,374,916 | B2* | 2/2013 | White | G06Q 20/04 455/410 |
| 2011/0138185 | A1* | 6/2011 | Ju | G06F 21/10 713/171 |
| 2011/0161660 | A1* | 6/2011 | Zhang | H04L 63/061 713/156 |
| 2011/0258452 | A1* | 10/2011 | Coulier | G06F 21/31 713/171 |

FOREIGN PATENT DOCUMENTS

| | | |
|---|---|---|
| CN | 102768744 A | 11/2012 |
| CN | 103237004 A | 8/2013 |

OTHER PUBLICATIONS

International Search Report dated Apr. 29, 2014, issued to International Application No. PCT/CN2014/071259.

* cited by examiner

KEY DOWNLOADING METHOD, MANAGEMENT METHOD, DOWNLOADING MANAGEMENT METHOD, DEVICE AND SYSTEM

CROSS-REFERENCE TO RELATED APPLICATIONS

This application is a national stage of International Application No. PCT/CN2014/071259, filed Jan. 23, 2014, which claims the benefit of priority to Chinese Application No. 201310084397.2, filed Mar. 15, 2013, in the State Intellectual Property Office, the disclosures of which are incorporated herein by reference.

TECHNICAL FIELD

The present invention relates to the field of electronic payment, in particular to a key downloading method, management method, downloading management method, device, and system of a POS terminal.

DESCRIPTION OF THE RELATED ART

Bank cards as a payment tool have become more and more popular. Usually, a bank card payment system includes a POS terminal (Point of Sales), a TMS (Terminal ManageSystem), a PIN PAD, and a HSM (Hardware and Security Module). Wherein, the POS terminal is a device which can receive the bank card information, has a communication function, and receives the teller's order to complete the financial transaction information and the related information exchange; the TMS system is a system of centralized management and transaction handling that performs centralized management on the POS terminal, including parameter downloading, key downloading, receiving, handling, or transferring of transaction requests of the POS terminal, and feeds back the trading result information to the POS terminal; the PIN PAD is a security device for securely storing and protecting various keys related to the financial transactions, and encrypting the PIN for protection; the hardware and security module (HSM) is a peripheral hardware device for encrypting the transmitted data, used to encrypt and decrypt the PIN, verify the correctiveness of the messages and documents, and store keys. A PIN (Personal Identification Number), namely a personal PIN, is data information for identifying the validity of the identity of the card holder in on-line transaction, which is not allowed to be shown as a clear text in any link of the computer and network system; a TMK (Terminal Master Key) is a master key for encrypting the working keys when the POS terminal works, which is stored in the database, can be used only and cannot be read. The POS terminal is widely applied to bank card payment occasions, for example, malls and hotels, and is an indispensable modern payment means which is seen everywhere in daily life. Bank cards, in particular debit cards, are usually set with a PIN by card holders. In the process of payment, the POS terminal uploads the magnetic track information of the bank card and also needs the PIN so that the issuing bank can verify the validity of the identification of the card holder, thus ensuring the payment security of the bank card and protecting the property security of the card holder. To prevent the PIN from being disclosed or being decrypted, it is required that the PIN is encrypted throughout the whole information interaction process from the terminal to the issuing bank. The PIN is not allowed to be shown as clear text in any link of the computer network system. Therefore, all POS terminals that receive PIN inputs are required to be configured with a key management system.

The key system of the POS terminal is classified into two levels: terminal master key (TMK) and working key (WK). Wherein, the TMK encrypts and protects the WK in the updating process of the MK. Every POS terminal shares an exclusive TMK with the TMS and must be provided with security protection to ensure that the TMK can only be written into the device and participate in the calculation and cannot be read; TMK is a critical root key; if the TMK is intercepted, the working key is easily cracked, which seriously endangers the payment security of the bank card. Whether the TMK can be securely downloaded into the POS terminal is critical to the security of the whole POS terminal. The following are existing TMK downloading methods:

1. Manual text clear input solution: the TMS generates the TMK clear text, directly manually input into the PIN PAD of the POS terminal. Such solution has a very big security hole; the operator easily intercepts the TMK clear text; a manual input error is possible; a great number of devices need the input of corresponding TMKs one by one; usually to enhance the security, the TMK varies with the POS, thus generating complicated and huge management costs and workloads.

2. IC card cipher text import solution: IC card cipher text import. The TMK is stored in the IC card after being generated by the TMS. The IC card holder sets the PIN to protect the TMK in the IC card. When the TMK is imported into the POS terminal, the TMK is imported into the PIN PAD after the PIN is entered through the PIN PAD of the POS terminal. For this solution, management personnel are required to insert the IC cards and set the PIN one by one when the TMS generates the POS terminal. To import the TMK into the POS terminal, it is also needed to manually enter the PIN. PIN leakage still may result in leakage of the TMK. Besides, huge management costs and workloads are generated when a great number of POSs employ such solution.

3. Local key parent POS solution: In the current payment industry, a local key downloading means is usually employed, and the master keys downloaded to the financial POS terminal must be downloaded locally to ensure secure downloading, which means that the financial POS terminals needs to be moved into the security machine room of the management center to be physically connected with the key parent POS in the security machine room, download the master key from the key parent POS through the operation of the management personnel, then distribute it to the deployed sites, and then remotely download the working keys through the master keys.

The above three solutions all have the following defects. The devices need to be moved into the security machine room of the management center to manually download the keys in a concentrated way. The machine room of the maintenance center bears a huge workload; the devices need moving to the security room of the management center to download the keys after delivery and then distribute them to the merchants, so the transport cost rises. To download the keys concentratedly, a great amount of labor and working time are needed; the maintenance cost is high; and the maintenance cycle is long.

At present, a remote key downloading solution is provided: the TMS system calls the HSM to generate a pair of public and private keys; the POS terminal calls the PIN PAD to randomly generate the TMK, encrypts the TMK by using the public key of the TMS and transmits the encrypted TMK to the TMS; the TMS calls the HSM, decrypts the TMK by using the private key, stores the decrypted TMK, encrypts the working key by using the TMK and then downloads it to the POS terminal. This solution has the following defects: the TMS cannot identify the identification of the POS terminal and prevent the fake terminal from connecting to the TMS to download the TMK; the POS terminal cannot identify the identification of the TMS and prevent the fake TMS background from downloading the fake TMK.

Contents of the Present Invention

To solve the above mentioned problems, the present invention adopts the following technical solutions:

A key downloading method is provided, comprising: generating a random number Rnd1 and sending a hardware sequence number SN and the first random number Rnd1 to a key server by a POS terminal; receiving the second random number Rnd2, a first cipher text C1 and a key server working certificate KSWCRT sent by the key server, via the POS terminal, wherein the first cipher text C1 is generated by encrypting the Rnd1 by using a private key PrKS corresponding to a public key PuKS included in a key server working certificate KSWCRT, by the key server; verifying the validity of the key server working certificate KSWCRT by using a key server root certificate KSRCRT, and if the key server working certificate KSWCRT is valid, extracting a public key PuKS from KSWCRT, and decrypting the first cipher text C1 by using PuKS to obtain a third random random number Rnd1', via the POS terminal; judging if the first random number Rnd1 and the third random number Rnd1' are consistent, and if so, encrypting the second random number Rnd1 by using a terminal authentication public key TKP_Pu to generate a third cipher text C2', and sending C2' to the key server, via the POS terminal; receiving the key cipher text Ctmk sent by the key server via the POS terminal, wherein the key cipher text Ctmk is generated by encrypting the terminal master key TMK by using the terminal authentication public key TKP_Pu corresponding to the hardware sequence number SN, by the key server; decrypting the key cipher text Ctmk by using a terminal authentication private key TKP_Pr to obtain a terminal master key TMK, and storing the TMK in a security control module, via the POS terminal.

Another technical solution adopted by the present invention is as follows:

A key management method is provided, comprising: receiving a hardware sequence number SN and a first random number Rnd1 sent by at least one POS terminal, by a key server; generating a second random number Rnd2, encrypting Rnd1 by using a private key PrKS corresponding to a public key PuKS included in a key server working certificate KSWCRT to generate a first cipher text C1, and sending Rnd1, C1, and KSWCRT to the POS terminal, via the key server; receiving a third cipher text C2' sent by the POS terminal, via the key server, wherein the third cipher text C2' is generated by encrypting the second random number Rnd2 by using the terminal authentication public key TKP_Pu, via the POS terminal; encrypting the second random number Rnd2 by using the terminal authentication public key TKP_Pu corresponding to the hardware sequence number SN to generate the second cipher text C2, via the key server; judging if the second cipher text C2 and the third cipher text C2' are consistent, and if so, encrypting the terminal master key TMK by using the terminal authentication public key TKP_Pu corresponding to the hardware sequence number SN to generate a cipher text Ctmk, and sending the key cipher text Ctmk to the POS terminal, via the key server.

Another technical solution adopted by the present invention is as follows:

A key downloading management method is provided, comprising: generating a random number Rnd1 and sending a hardware sequence number SN and the first random number Rnd1 to a key server by a POS terminal; receiving a hardware sequence number SN and a first random number Rnd1 sent by at least one POS terminal, via a key server; generating a second random number Rnd2, encrypting Rnd1 by using a private key PrKS corresponding to a public key PuKS included in a key server working certificate KSWCRT to generate a first cipher text C1, and sending Rnd1, C1, and KSWCRT to the POS terminal, via the key server; receiving the second random number Rnd2, the first cipher text C1 and the key server working certificate KSWCRT sent by the key server, via the POS terminal; verifying the validity of the key server working certificate KSWCRT by using a key server root certificate KSRCRT, and if the key server working certificate KSWCRT is valid, extracting a public key PuKS from KSWCRT, and decrypting the first cipher text C1 by using PuKS to obtain a third random random number Rnd1', via the POS terminal; judging if the first random number Rnd1 and the third random number Rnd1' are consistent, and if so, encrypting the second random number Rnd1 by using a terminal authentication public key TKP_Pu to generate a third cipher text C2', and sending C2' to the key server, via the POS terminal; receiving the third cipher text C2' sent by at least one POS terminal, via the key server; encrypting the second random number Rnd2 by using the terminal authentication public key TKP_Pu corresponding to the hardware sequence number SN to generate the second cipher text C2, via the key server; judging if the second cipher text C2 and the third cipher text C2' are consistent, and if so, encrypting the terminal master key TMK by using the terminal authentication public key TKP_Pu corresponding to the hardware sequence number SN to generate a cipher text Ctmk, and sending the key cipher text Ctmk to the POS terminal, via the key server; receiving the cipher text Ctmk sent via the key server, via the POS terminal; decrypting the key cipher text Ctmk by using a terminal authentication private key TKP_Pr to obtain a terminal master key TMK, and storing the TMK in a security control module, via the POS terminal.

Another technical solution adopted by the present invention is as follows:

A key downloading device is provided, comprising: a first sending unit for generating a random number Rnd1 and sending a hardware sequence number SN and the first random number Rnd1 to a key server; a first receiving unit for receiving the second random number Rnd2, a first cipher text C1 and a key server working certificate KSWCRT sent via the key server, wherein the first cipher text C1 is generated by encrypting the Rnd1 by using a private key PrKS corresponding to a public key PuKS included in a key server working certificate KSWCRT, via the key server; a server verifying unit for verifying the validity of a key server working certificate KSWCRT by using a key server root certificate KSRCRT; a first decrypting unit for extracting a public key PuKS from KSWCRT when the verification result of the server verifying unit is positive, and decrypting the first cipher text C1 by using PuKS to obtain a third random number Rnd1'; a first judging unit for judging if the first random number Rnd1 and the third random number Rnd1' are consistent; a first encrypting unit for encrypting the second random number Rnd2 by using a terminal authentication public key TKP_Pu to generate a third cipher text C2' when judging that the first random number Rnd1 and the third random number Rnd1' are consistent, and sending C2' to the key server; a second receiving unit for receiving the key cipher text Ctmk sent by the key server, wherein the key cipher text Ctmk is generated by encrypting the terminal master key TMK by using the terminal authentication public key TKP_Pu corresponding to the hardware sequence number SN, via the key server; and, a second decrypting unit for decrypting the key cipher text Ctmk by using a terminal authentication private key TKP_Pr to obtain a terminal master key TMK, and storing the TMK in a security control module.

Another technical solution adopted by the present invention is as follows:

A key management device is provided, comprising: a third receiving unit receiving a hardware sequence number SN and a first random number Rnd1 sent by at least one POS terminal; a second encrypting unit for generating a second random number Rnd2, encrypting Rnd1 by using a private key PrKS corresponding to a public key PuKS included in a key server working certificate KSWCRT to generate a first cipher text C1, and sending Rnd2, C1, and KSWCRT to the POS terminal; a fourth receiving unit for receiving a third cipher text C2' sent by the POS terminal, wherein the third cipher text C2' is generated by encrypting the second random number Rnd2 by using the terminal authentication public key TKP_Pu, via the POS terminal; a third encrypting unit for encrypting the second random number Rnd2 by using the terminal authentication public key TKP_Pu corresponding to the hardware sequence number SN to generate the second cipher text C2; a second judging unit for judging if the second cipher text C2 and the third cipher text C2' are consistent; a fourth encrypting unit for encrypting a terminal master key TMK by using a terminal authentication public key TKP_Pu corresponding to the hardware sequence number SN to generate a cipher text Ctmk, and sending the key cipher text Ctmk to the POS terminal when the second judging unit judges that the second cipher text C2 and the third cipher text C2' are consistent.

Another technical solution adopted by the present invention is as follows:

A key downloading management system is provided, comprising a key server and at least one POS terminal in communication connection with the key server; the key server comprises a key management device as mentioned above; and the device terminals comprise the key downloading device as mentioned above.

The key downloading method, management method, downloading management method, device, and system of the present invention employ non-symmetric key management technology to realize bidirectional valid identification, ensuring the validity of both communication parties. The master key is downloaded remotely, thus avoiding a situation where the POS terminal releases the master keys to the merchants after concentratedly downloading the master keys, and reducing logistics costs and maintenance costs.

DESCRIPTION OF THE MAIN COMPONENTS

POS terminal 1; key downloading device 10; key server 3; key management device 30;

first sending unit 11; first receiving unit 12; server verifying unit 13;

first decrypting unit 14; first judging unit 15; first encrypting unit 16; second receiving unit 17;

second decrypting unit 18; third receiving unit 31; second encrypting unit 32; fourth receiving unit 33;

third encrypting unit 34; second judging unit 35; fourth encrypting unit 36.

DETAILED DESCRIPTION OF THE PRESENT INVENTION

The technical contents, structural characteristics, fulfilled objectives, and effects of the present invention are described in detail with reference to the embodiments and attached drawings.

The non-symmetric keys are defined and described first: Non-symmetric keys: Non-symmetric encryption algorithms need two keys: a public key and private key. The public key and the private key are a pair. If the data is encrypted by using the public key, then the corresponding private key can implement the decryption; if the data is the encrypted by the private key, then only the corresponding public key can implement the decryption. Two different keys are used to implement the encryption and decryption, so such algorithm is also called a non-symmetric encryption algorithm. The basic process where the non-symmetric encryption algorithm realizes exchange of the confidential information is as follows: Party A generates a pair of keys and discloses one of the keys as the public key to the other parties; Part B receives the public key and uses the key to encrypt the confidential information and then sends the encrypted information to Party A; Party B uses another exclusive key to decrypt the encrypted information. Party A can encrypt the confidential information by using the public key of Party B and then sends the encrypted information to Party B; then, Party B decrypts the encrypted information by using its own private key. Main algorithms include: RSA, Elgamal, knapsack algorithm, Rabin, D-H, ECC (Elliptic Curve Cryptography).

Figure 1:
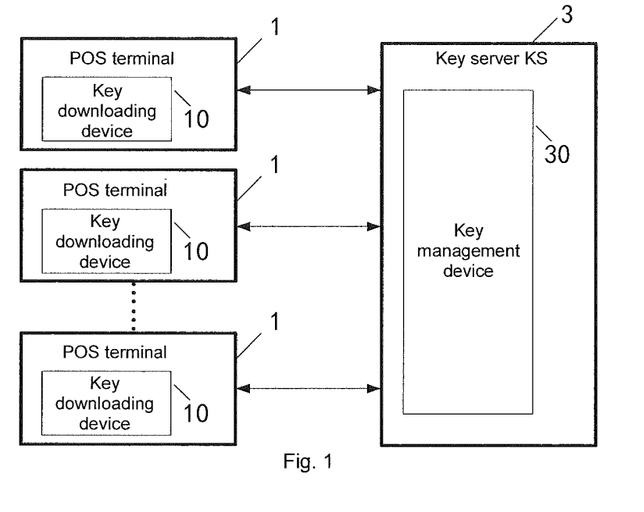
FIG. 1 is a structural diagram of a key downloading management system in embodiment 1 of the present invention.

Refer to FIG. 1, which is a structural diagram of the key downloading management system in embodiment 1 of the present invention. The key downloading management system comprises a key server 3 and at least one POS terminal 1 in communication connection with the key server 3; the key server 3 comprises a key management device 30; the POS terminal 1 comprises a key downloading device 10; the POS terminal 1 is a POS terminal; the key server 3 is a remote key server, located in the machine room of the management center, responsible for generation and maintenance of the keys such as the master key and working key of the POS terminal; the key server 3 comprises a key database, namely the master key database or working key database of the POS terminal, here representing the TMK database downloaded remotely, and usually a special hardware and security module generates the key database and stores the keys.

Figure 2:
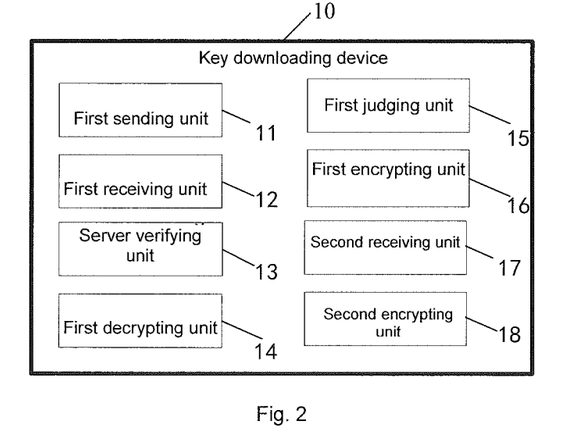
FIG. 2 is a structural diagram of a key downloading device in embodiment 1 of the present invention.

Refer to FIG. 2, which is a structural diagram of a key downloading device in embodiment 1 of the present invention. A key downloading device 10 comprises a first sending unit 11, a first receiving unit 12, a server verifying unit 13, a first decrypting unit 14, a first judging unit 15, a first encrypting unit 16, a second receiving unit 17 and a second decrypting unit 18.

The first sending unit 11 is used for generating a random number Rnd1 and sending a hardware sequence number SN and the first random number Rnd1 to a key server; the first receiving unit 12 is used for receiving the second random number Rnd2, a first cipher text C1 and a key server working certificate KSWCRT sent by the key server, wherein the first cipher text C1 is generated by encrypting the Rnd1 by using a private key PrKS corresponding to a public key PuKS included in a key server working certificate KSWCRT, by the key server; the server verifying unit 13 is used for verifying the validity of a key server working certificate KSWCRT by using a key server root certificate KSRCRT; the first decrypting unit 14 is used for extracting a public key PuKS from KSWCRT when the verification result of the server verifying unit is positive, and decrypting the first cipher text C1 by using PuKS to obtain a third random number Rnd1'; the first judging unit 15 is used for judging if the first random number Rnd1 and the third random number Rnd1' are consistent; the first encrypting unit 16 is used for encrypting the second random number Rnd1 by using a terminal authentication public key TKP_Pu to generate a third cipher text C2' when the first judging unit 15 judges that the first random number Rnd1 and the third random number Rnd1' are consistent, and sending C2' to the key server; the second receiving unit 17 is used for receiving the key cipher text Ctmk sent by the key server, wherein the key cipher text Ctmk is generated by encrypting the terminal master key TMK by using the terminal authentication public key TKP_Pu corresponding to the hardware sequence number SN, via the key server, wherein the terminal authentication key pair TPK is a non-symmetric key pair, consisting of TPK_Pu and TPK_Pr; the key pair can be randomly generated in the POS terminal 1, or generated by an external key generator in a secure environment and then guided into the POS terminal 1; TPK_Pu is exported from the POS terminal 1 or exported from the special key generator after delivery of the POS terminal 1, and taking the SN as the index, together with the corresponding SN stored in the terminal authentication public key database of the RKS server 3. TPK_Pr is stored in the security media of the POS terminal 1, and the POS terminal 1 has an anti-attack mechanism, ensuring that TPK_Pr is destroyed immediately after being attacked. Wherein, TPK_Pu and TPK_Pr are non-symmetric keys, for example RSA, Elgamal, knapsack algorithm, Rabin, D-H, or ECC (Elliptic Curve Cryptograph). The second decrypting unit 18 is used for decrypting the key cipher text Ctmk by using the terminal authentication private key TKP_Pr to obtain a terminal master key TMK, and storing the TMK in the security control module.

Figure 3:
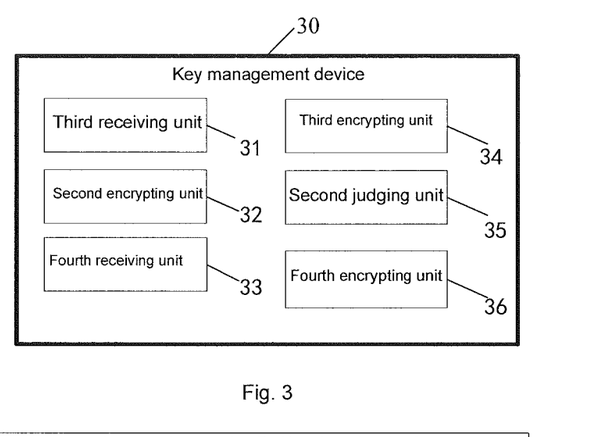
FIG. 3 is a structural diagram of a key management device in embodiment 1 of the present invention.

Refer to FIG. 3, which is a structural diagram of a key management device in embodiment 1 of the present invention. A key management device 30 comprises a third receiving unit 31, a second encrypting unit 32, a fourth receiving unit 33, a third encrypting unit 34, a second judging unit 35, and a fourth encrypting unit 36.

The third receiving unit 31 is used for receiving a hardware sequence number SN and a first random number Rnd1 sent by at least one POS terminal; the second encrypting unit 32 is used for generating a second random number Rnd2, encrypting Rnd1 by using a private key PrKS corresponding to a public key PuKS included in a key server working certificate KSWCRT to generate a first cipher text C1, and sending Rnd1, C1, and KSWCRT to the POS terminal; the fourth receiving unit 33 is used for receiving a third cipher text C2' sent by the POS terminal, wherein the third cipher text C2' is generated by encrypting the second random number Rnd2 by using the terminal authentication public key TKP_Pu, via the POS terminal; the third encrypting unit 34 is used for encrypting the second random number Rnd2 by using the terminal authentication public key TKP_Pu corresponding to the hardware sequence number SN to generate the second cipher text C2; the second judging unit 35 is used for judging if the second cipher text C2 and the third cipher text C2' are consistent; the fourth encrypting unit 36 is used for encrypting a terminal master key TMK by using a terminal authentication public key TKP_Pu corresponding to the hardware sequence number SN to generate a cipher text Ctmk, and sending the key cipher text Ctmk to the POS terminal when the second judging unit 35 judges that the second cipher text C2 and the third cipher text C2' are consistent.

Figure 4:
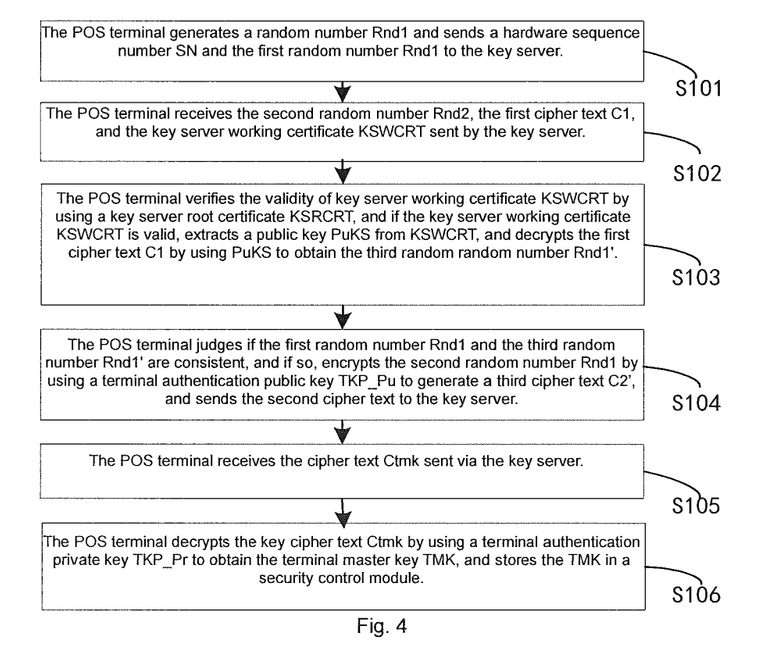
FIG. 4 is a flowchart of a key downloading method in embodiment 1 of the present invention.

Refer to FIG. 4, which is a flowchart of a key downloading method in embodiment 1 of the present invention. The key downloading method operates in the POS terminal 1. The method is carried out as follows:

Step S101. The POS terminal generates a random number Rnd1 and sends a hardware sequence number SN and the first random number Rnd1 to the key server.

Step S102. The POS terminal receives the second random number Rnd2, the first cipher text C1, and the key server working certificate KSWCRT sent by the key server, wherein the first cipher text C1 is generated by encrypting the Rnd1 by using the private key PrKS corresponding to the public key PuKS included in the key server working certificate KSWCRT, via the key server.

Step S103. The POS terminal verifies the validity of key server working certificate KSWCRT by using a key server root certificate KSRCRT, and if the key server working certificate KSWCRT is valid, extracts a public key PuKS from KSWCRT, and decrypts the first cipher text C1 by using PuKS to obtain the third random random number Rnd1'.

Step S104. The POS terminal judges if the first random number Rnd1 and the third random number Rnd1' are consistent, and if so, encrypts the second random number Rnd2 by using a terminal authentication public key TKP_Pu to generate a third cipher text C2', and sends the second cipher text to the key server.

Step S105. The POS terminal receives the key cipher text Ctmk sent by the key server, wherein the key cipher text Ctmk is generated by encrypting the terminal master key TMK by using the terminal authentication public key TKP_Pu corresponding to the hardware sequence number SN, via the key server.

Step S106. The POS terminal decrypts the key cipher text Ctmk by using a terminal authentication private key TKP_Pr to obtain the terminal master key TMK, and stores the TMK in a security control module.

Figure 5:
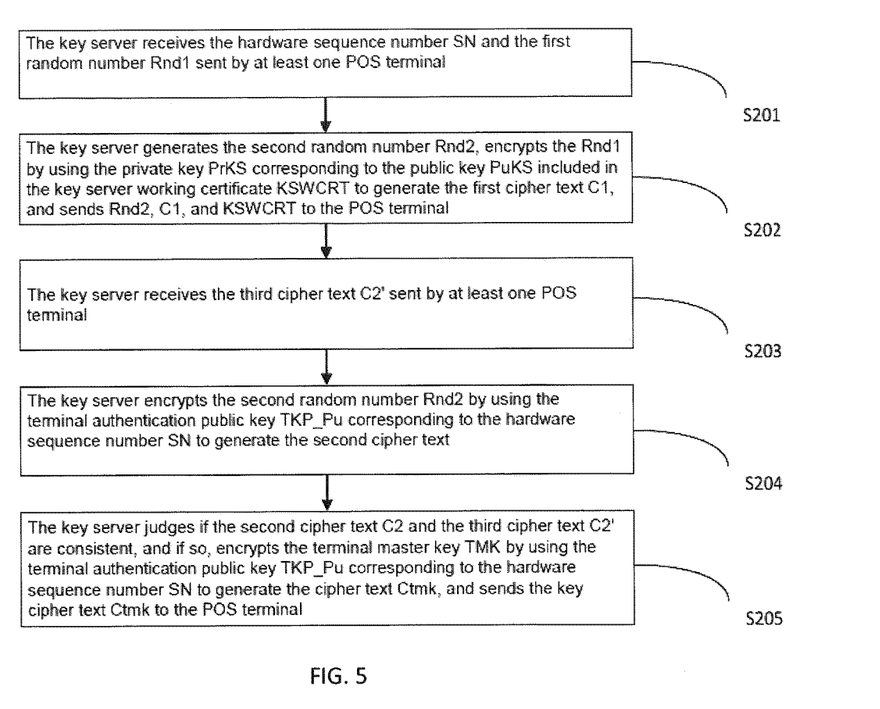
FIG. 5 is a flowchart of a key management method in embodiment 1 of the present invention.

Refer to FIG. 5, which is a flowchart of a key management method in embodiment of the present invention. The key management method operates in the key server 3. The method is carried out as follows:

Step S201. The key server receives the hardware sequence number SN and the first random number Rnd1 sent by at least one POS terminal.

Step S202. The key server generates the second random number Rnd2, encrypts the Rnd1 by using the private key PrKS corresponding to the public key PuKS included in the key server working certificate KSWCRT to generate the first cipher text C1, and sends Rnd2, C1, and KSWCRT to the POS terminal.

Step S203. The key server receives the third cipher text C2' sent by the POS terminal, wherein the third cipher text C2' is generated by encrypting the second random number Rnd2 by using the terminal authentication public key TKP_Pu, via the POS terminal.

Step S204. The key server encrypts the second random number Rnd2 by using the terminal authentication public key TKP_Pu corresponding to the hardware sequence number SN to generate the second cipher text C2.

Step S205. The key server judges if the second cipher text C2 and the third cipher text C2' are consistent, and if so, encrypts the terminal master key TMK by using the terminal authentication public key TKP_Pu corresponding to the hardware sequence number SN to generate the cipher text Ctmk, and sends the key cipher text Ctmk to the POS terminal.

Figure 6:
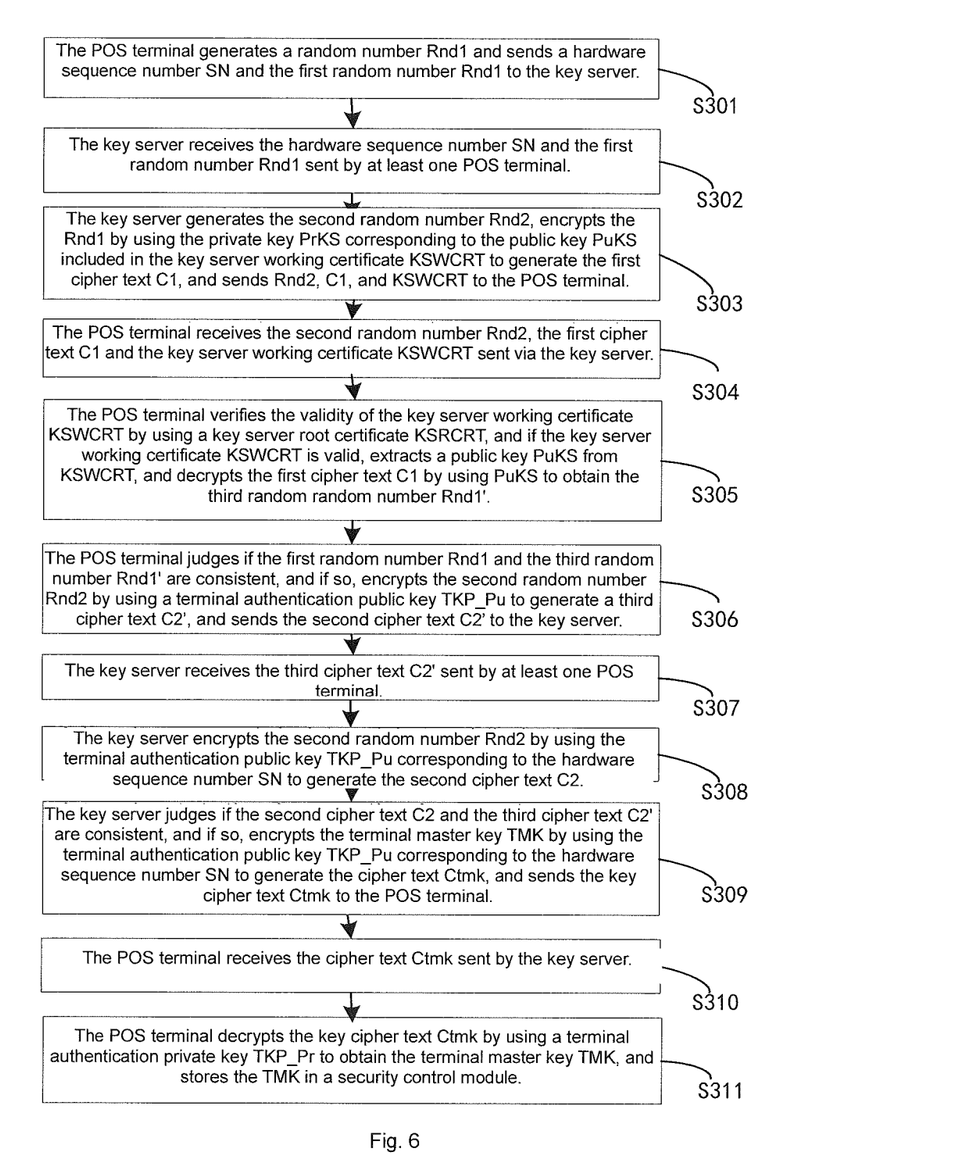
FIG. 6 is a flowchart of a key downloading management method in embodiment 1 of the present invention.
Figure 7:
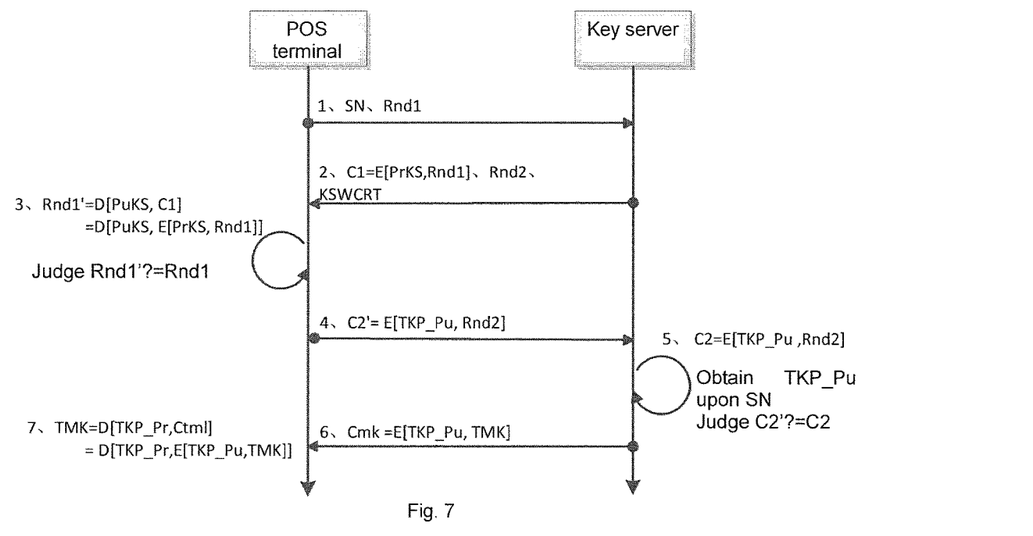
FIG. 7 is a schematic view of the signal transmission of a key downloading management method in embodiment 1 of the present invention.

Refer to FIG. 6 and FIG. 7 together. FIG. 6 is a flowchart of a key downloading management method in embodiment 1 of the present invention. FIG. 7 is a schematic view of the signal transmission of a key downloading management method in embodiment 1 of the present invention. The key downloading management method operates in the key downloading management system. The method is carried out as follows:

Step S301. The POS terminal generates a random number Rnd1 and sends a hardware sequence number SN and the first random number Rnd1 to the key server.

Step S302. The key server receives the hardware sequence number SN and the first random number Rnd1 sent by at least one POS terminal.

Step S303. The key server generates a second random number Rnd2, encrypts the Rnd1 by using the private key PrKS corresponding to the public key PuKS included in the key server working certificate KSWCRT to generate the first cipher text C1, namely C1=E[PrKS,Rnd1], and sends Rnd1, C1, and KSWCRT to the POS terminal.

Step S304. The POS terminal receives the second random number Rnd2, the first cipher text C1 and the key server working certificate KSWCRT sent by the key server.

Step S305. The POS terminal verifies the validity of the key server working certificate KSWCRT by using a key server root certificate KSRCRT, and if the key server working certificate KSWCRT is valid, extracts a public key PuKS from KSWCRT, and decrypts the first cipher text C1 by using PuKS to obtain the third random random number Rnd1', namely Rnd1'=D[PuKS, C1]=D[PuKS, E[PrKS, Rnd1]].

Step S306. The POS terminal judges if the first random number Rnd1 and the third random number Rnd1' are consistent, and if so, encrypts the second random number Rnd2 by using a terminal authentication public key TKP_Pu to generate a third cipher text C2', namely C2'=E[TKP_Pu, Rnd2], and sends C2' to the key server.

Step S307. The key server receives the third cipher text C2' sent by at least one POS terminal.

Step S308. The key server encrypts the second random number Rnd2 by using the terminal authentication public key TKP_Pu corresponding to the hardware sequence number SN to generate the second cipher text C2, namely C2=E[TKP_Pu,Rnd2].

Step S309. The key server judges if the second cipher text C2 and the third cipher text C2' are consistent, and if so, encrypts the terminal master key TMK by using the terminal authentication public key TKP_Pu corresponding to the hardware sequence number SN to generate the key cipher text Ctmk, namely Cmk=E[TKP_Pu, TMK], and sends the key cipher text Ctmk to the POS terminal.

Step S310. The POS terminal receives the cipher text Ctmk sent by the key server.

Step S311. The POS terminal decrypts the key cipher text Ctmk by using the terminal authentication private key TKP_Pr to obtain the terminal master key TMK, namely TMK=D[TKP_Pr,Ctml]=D[TKP_Pr,E[TKP_Pu,TMK], and stores the TMK in a security control module.

The key downloading method, management method, downloading management method, device, and system of the present invention employ non-symmetric key management technology to realize bidirectional valid identification, ensuring the validity of the both communication parties. The master key is downloaded remotely, avoiding a situation where the POS terminal releases the master keys to the merchants after concentratedly downloading the master keys, and reducing logistics costs and maintenance costs. When downloading the keys remotely, the key server adopts the symmetric algorithm to encrypt the keys to be transmitted, ensuring that only the corresponding POS terminal can decrypt the encrypted keys and ensuring the security of data transmission. The terminal identity authentication private key TKP_Pr is stored in the hardware encrypting module and is not exported, while the secondary development environment of the terminal does not provide any operation functions encrypted and decrypted by TKP_Pr and only provides one function for remotely downloading the key, thus ensuring the security of the private key. The clear text key remotely downloaded into the terminal is encrypted by using the public key TKP_Pu of the terminal at the key server KS to obtain the cipher text data. The public key TKP_Pu of the terminal cannot be transmitted in the public communication network, does not provide any operation function for exporting TKP_Pu in the secondary development environment of the terminal except the production link of the terminal, and only provides a TKP_Pu encrypted function, thus ensuring the security of the public key. During bidirectional authentication, the application terminal of the terminal cannot touch the clear text key required to be remotely downloaded into the terminal, and can only touch the cipher text form of the key, thus ensuing secure transfer.

The above are only some embodiments of the present invention and shall not be regarded as limits to the present invention. Any equivalent structure or equivalent flow modifications made on the basis of the description and attached drawings of the present invention, or direct or indirect application to other related fields, shall fall within the protective scope of the present invention.

What is claimed is:

1. A key downloading method, comprising:
generating a random number Rnd1 and sending a hardware sequence number SN and the first random number Rnd1 to a key server by a POS terminal;
receiving a second random number Rnd2, a first cipher text C1, and a key server working certificate KSWCRT sent by the key server, via the POS terminal, wherein the first cipher text C1 is generated by encrypting the Rnd1 by using a private key PrKS corresponding to a public key PuKS included in a key server working certificate KSWCRT, via the key server;

verifying the validity of the key server working certificate KSWCRT by using a key server root certificate KSRCRT, and if the key server working certificate KSWCRT is valid, extracting a public key PuKS from KSWCRT, and decrypting the first ciphertext C1 by using PuKS to obtain a third random random number Rnd1', via the POS terminal;

judging if the first random number Rnd1 and the third random number Rnd1' are consistent, and if so, encrypting the second random number Rnd2 by using a terminal authentication public key TKP_Pu to generate a third cipher text C2', and sending C2' to the key server, via the POS terminal;

receiving a key cipher text Ctmk sent by the key server via the POS terminal, wherein the key cipher text Ctmk is generated by encrypting tbea terminal master key TMK by using the terminal authentication public key TKP_Pu corresponding to the hardware sequence number SN, via the key server;

decrypting the key cipher text Ctmk by using a terminal authentication private key TKP_Pr to obtain a terminal master key TMK, and storing the TMK in a security control module, via the POS terminal, wherein the terminal master key TMK enables secure bank card transactions to occur at the POS terminal.

2. A key management method, comprising:

receiving a hardware sequence number SN and a first random number Rnd1 sent by at least one POS terminal, by a key server;

generating a second random number Rnd2, encrypting Rnd1 by using a private key PrKS corresponding to a public key PuKS included in a key server working certificate KSWCRT to generate a first ciphertext C1, and sending Rnd2, C1, and KSWCRT to the POS terminal, via the key server;

receiving a third cipher text C2' sent by the POS terminal, via the key server, wherein the third cipher text C2' is generated by encrypting the second random number Rnd2 by using a terminal authentication public key TKP_Pu, via the POS terminal;

encrypting the second random number Rnd2 by using the terminal authentication public key TKP_Pu corresponding to the hardware sequence number SN via the key server to generate the second cipher text C2;

judging if the second cipher text C2 and the third cipher text C2' are consistent, and if so, encrypting a terminal master key TMK by using the terminal authentication public key TKP_Pu corresponding to the hardware sequence number SN to generate a cipher text Ctmk, and sending the key cipher text Ctmk to the POS terminal, via the key server, wherein the terminal master key TMK enables secure bank card transactions to occur at the POS terminal.

3. A master key downloading management method, comprising:

generating a random number Rnd1 and sending a hardware sequence number SN and the first random number Rnd1 to a key server by a POS terminal;

receiving a hardware sequence number SN and a first random number Rnd1 sent by at least one POS terminal, by a key server;

generating a second random number Rnd2, encrypting Rnd1 by using a private key PrKS corresponding to a public key PuKS included in a key server working certificate KSWCRT to generate a first ciphertext C1, and sending Rnd2, C1, and KSWCRT to the POS terminal, via the key server;

receiving the second random number Rnd2, the first ciphertext C1 and the key server working certificate KSWCRT sent by the key server, via the POS terminal;

verifying the validity of the key server working certificate KSWCRT by using a key server root certificate KSRCRT, and if the key server working certificate KSWCRT is valid, extracting a public key PuKS from KSWCRT, and decrypting the first ciphertext C1 by using PuKS to obtain a third random random number RndT, via the POS terminal;

judging if the first random number Rnd1 and the third random number RndT are consistent, and if so, encrypting the second random number Rnd2 by using a terminal authentication public key TKP_Pu to generate a third ciphertext C2', and sending C2' to the key server, via the POS terminal;

receiving the third cipher text C2' sent by at least one POS terminal, via the key server;

encrypting the second random number Rnd2 by using the terminal authentication public key TKP_Pu corresponding to the hardware sequence number SN via the key server to generate the second cipher text C2;

judging if the second ciphertext C2 and the third cipher text C2' are consistent, and if so, encrypting a terminal master key TMK by using the terminal authentication public key TKP_Pu corresponding to the hardware sequence number SN to generate a cipher text Ctmk, and sending the key cipher text Ctmk to the POS terminal, via the key server;

receiving the cipher text Ctmk sent by the key server, via the POS terminal;

decrypting the key cipher text Ctmk by using a terminal authentication private key TKP_Pr to obtain a terminal master key TMK, and storing the TMK in a security control module, via the POS terminal, wherein the terminal master key TMK enables secure bank card transactions to occur at the POS terminal.

4. A key downloading device, comprising:

a first sending unit for generating a random number Rnd1 and sending a hardware sequence number SN and the first random number Rnd1 to a key server;

a first receiving unit for receiving a second random number Rnd2, a first cipher text C1 and a key server working certificate KSWCRT sent by the key server, wherein the first cipher text C1 is generated by encrypting the Rnd1 by using a private key PrKS corresponding to a public key PuKS included in a key server working certificate KSWCRT, via the key server;

a server verifying unit for verifying the validity of a key server working certificate KSWCRT by using a key server root certificate KSRCRT:

a first decrypting unit for extracting a public key PuKS from KSWCRT when the verification result of the server verifying unit is positive, and decrypting the first cipher text C1 by using PuKS to obtain a third random random number RndT;

a first judging unit for judging if the first random number Rnd1 and the third random number RndT are consistent;

a first encrypting unit for encrypting the second random number Rnd2 by using a terminal authentication public key TKP_Pu to generate a third cipher text C2' when judging that the first random number Rnd1 and the third random number RndT are consistent, and sending C2' to the key server;

a second receiving unit for receiving a key cipher text Ctmk sent by the key server, wherein the key cipher text Ctmk is generated by encrypting a terminal master key TMK by using a terminal authentication public key TKP_Pu corresponding to the hardware sequence number SN, via the key server;

a second decrypting unit for decrypting the key cipher text Ctmk by using a terminal authentication private key TKP_Pr to obtain a terminal master key TMK, and storing the TMK in a security control module, wherein the terminal master key TMK enables secure bank card transactions to occur at the POS terminal.

5. A key management device, comprising:

a third receiving unit receiving a hardware sequence number SN and a first random number Rnd1 sent by at least one POS terminal;

a second encrypting unit for generating a second random number Rnd2, encrypting Rnd1 by using a private key PrKS corresponding to a public key PuKS included in a key server working certificate KSWCRT to generate a first ciphertext C1, and sending Rnd2, C1, and KSWCRT to the POS terminal;

a fourth receiving unit for receiving a third cipher text C2' sent by the POS terminal, wherein the third cipher text C2' is generated by encrypting the second random number Rnd2 by using a terminal authentication public key TKP_Pu, via the POS terminal;

a third encrypting unit for encrypting the second random number Rnd2 by using the terminal authentication public key TKP_Pu corresponding to the hardware sequence number SN to generate the second cipher text C2;

a second judging unit for judging if the second cipher text C2 and the third cipher text C2' are consistent;

a fourth encrypting unit for encrypting a terminal master key TMK by using a terminal authentication public key TKP_Pu corresponding to the hardware sequence number SN to generate a cipher text Ctmk, and sending the key cipher text Ctmk to the POS terminal when the second judging unit judges that the second cipher text C2 and the third cipher text C2' are consistent, wherein the terminal master key TMK enables secure bank card transactions to occur at the POS terminal.

6. A key downloading management system, comprising a key server and at least one POS terminal in communication connection with the key server, wherein the key server comprises a key management device, the key management device comprising:

a third receiving unit receiving a hardware sequence number SN and a first random number Rnd1 sent by at least one POS terminal;

a second encrypting unit for generating a second random number Rnd2, encrypting Rnd1 by using a private key PrKS corresponding to a public key PuKS included in a key server working certificate KSWCRT to generate a first cipher text C1, and sending Rnd2, C1, and KSWCRT to the POS terminal;

a fourth receiving unit for receiving a third cipher text C2' sent by the POS terminal, wherein the third ciphertext C2' is generated by encrypting the second random number Rnd2 by using the terminal authentication public key TKP_Pu, via the POS terminal;

a third encrypting unit for encrypting the second random number Rnd2 by using the terminal authentication public key TKP_Pu corresponding to the hardware sequence number SN to generate the second ciphertext C2;

a second judging unit for judging if the second ciphertext C2 and the third cipher text C2' are consistent;

a fourth encrypting unit for encrypting a terminal master key TMK by using a terminal authentication public key TKP_Pu corresponding to the hardware sequence number SN to generate a ciphertext Ctmk, and sending the key ciphertext Ctmk to the POS terminal when the second judging unit judges that the second cipher text C2 and the third cipher text C2' are consistent; and the at least one POS terminal comprises a key downloading device, the key downloading device comprising:

a first sending unit for generating a random number Rnd1 and sending a hardware sequence number SN and the first random number Rnd1 to the key server;

a first receiving unit for receiving the second random number Rnd2, a first cipher text C1 and a key server working certificate KSWCRT sent by the key server, wherein the first ciphertext C1 is generated by encrypting the Rnd1 by using a private key PrKS corresponding to a public key PuKS included in a key server working certificate KSWCRT, via the key server;

a server verifying unit for verifying the validity of a key server working certificate KSWCRT by using a key server root certificate KSRCRT;

a first decrypting unit for extracting a public key PuKS from KSWCRT when the verification result of the server verifying unit is positive, and decrypting the first cipher text C1 by using PuKS to obtain a third random random number RndT;

a first judging unit for judging if the first random number Rnd1 and the third random number RndT are consistent;

a first encrypting unit for encrypting the second random number Rnd2 by using a terminal authentication public key TKP_Pu to generate a third ciphertext C2' when judging that the first random number Rnd1 and the third random number RndT are consistent, and sending C2' to the key server;

a second receiving unit for receiving the key cipher text Ctmk sent by the key server, wherein the key cipher text Ctmk is generated by encrypting the terminal master key TMK by using the terminal authentication public key TKP_Pu corresponding to the hardware sequence number SN, via the key server;

a second decrypting unit for decrypting the key cipher text Ctmk by using a terminal authentication private key TKP_Pr to obtain a terminal master key TMK, and storing the TMK in a security control module, wherein the terminal master key TMK enables secure bank card transactions to occur at the POS terminal.

* * * * *